US008793718B2

(12) United States Patent
White

(10) Patent No.: US 8,793,718 B2
(45) Date of Patent: Jul. 29, 2014

(54) SYSTEM AND METHOD FOR COLLECTING OPINION DATA

(75) Inventor: Scott White, Austin, TX (US)

(73) Assignee: AT&T Intellectual Property I, LP, Atlanta, GA (US)

(*) Notice: Subject to any disclaimer, the term of this patent is extended or adjusted under 35 U.S.C. 154(b) by 846 days.

(21) Appl. No.: 11/972,474

(22) Filed: Jan. 10, 2008

(65) Prior Publication Data
US 2009/0183204 A1 Jul. 16, 2009

(51) Int. Cl.
H04N 7/173 (2011.01)

(52) U.S. Cl.
USPC .................................. 725/24; 725/9

(58) Field of Classification Search
CPC  G06Q 30/02; G06Q 30/0202; G06Q 30/0201
USPC .................. 725/24, 44, 32–36, 9, 16
See application file for complete search history.

(56) References Cited

U.S. PATENT DOCUMENTS

| 5,991,735 | A  | * | 11/1999 | Gerace ........................... 705/7.33 |
| 6,513,014 | B1 | * | 1/2003  | Walker et al. ................. 705/7.32 |
| 7,212,988 | B1 | * | 5/2007  | Feldten ........................... 705/10 |
| 7,810,114 | B2 | * | 10/2010 | Flickinger et al. ............. 725/32 |
| 2002/0053077 | A1 | * | 5/2002 | Shah-Nazaroff et al. ....... 725/13 |
| 2002/0095679 | A1 | * | 7/2002 | Bonini ............................ 725/74 |
| 2002/0178447 | A1 | * | 11/2002 | Plotnick et al. ................. 725/36 |
| 2003/0093792 | A1 | * | 5/2003 | Labeeb et al. .................. 725/46 |
| 2004/0260575 | A1 | * | 12/2004 | Massey, Jr. ........................ 705/1 |
| 2005/0159993 | A1 | * | 7/2005 | Kordas et al. .................... 705/10 |
| 2006/0107195 | A1 | * | 5/2006 | Ramaswamy et al. ..... 715/500.1 |
| 2006/0161952 | A1 | * | 7/2006 | Herz et al. ....................... 725/46 |
| 2007/0061199 | A1 | * | 3/2007 | Montgomery et al. ......... 705/14 |
| 2008/0066106 | A1 | * | 3/2008 | Ellis et al. ....................... 725/40 |
| 2009/0165033 | A1 | * | 6/2009 | Clancy ............................ 725/25 |
| 2009/0187939 | A1 | * | 7/2009 | Lajoie ............................. 725/34 |
| 2009/0228326 | A1 | * | 9/2009 | White ............................. 705/10 |

FOREIGN PATENT DOCUMENTS

EP         0263635        4/1988

OTHER PUBLICATIONS

The Nielsen Company, "Nielsen Media Research", 1 page, www.nielsenmedia.com/nc/portal/site/Public, website last visited Dec. 3, 2007.

* cited by examiner

Primary Examiner — John Schnurr
Assistant Examiner — Alexander Q Huerta
(74) Attorney, Agent, or Firm — Guntin & Gust, PLC; Jay H. Anderson

(57) ABSTRACT

A system that incorporates teachings of the present disclosure may include, for example, a media processor having a controller to present a user of the media processor a solicitation initiated by a media content supplier requesting an opinion survey of unpublished media content, receive the unpublished media content responsive to submitting an acceptance of the solicitation, and submit the opinion survey to the media content supplier responsive to receiving a response from the user. Other embodiments are disclosed.

20 Claims, 7 Drawing Sheets

100

400

500

SYSTEM AND METHOD FOR COLLECTING OPINION DATA

FIELD OF THE DISCLOSURE

The present disclosure relates generally to opinion collection techniques and more specifically to a system and method for collecting opinion data.

BACKGROUND

Preview screenings for upcoming media content such as movies, music albums, and TV shows are commonly used by media developers as a means to refine and improve the content and strategize its general release. Typically, media content suppliers conduct focus group studies in controlled facilities and at times in several areas across the country (and internationally). The data collected from the screenings is generally analyzed by region and in the aggregate to determine among other things the potential value of the content, and how best to commercialize it.

DETAILED DESCRIPTION

In one embodiment of the present disclosure, a computer-readable storage medium can have computer instructions for receiving unpublished media content, soliciting a plurality of subscribers to review the unpublished media content over a Set-Top Box (STB), transmitting the unpublished media content to one or more STBs of at least a portion of the plurality of subscribers responsive to receiving an agreement from each of the portion of the plurality of subscribers to complete an opinion survey on a presentation of the unpublished media content, and receiving the opinion survey from the portion of the plurality of subscribers.

In another embodiment of the present disclosure, a computer-readable storage medium can have computer instructions for soliciting users of STBs to provide a response to a presentation of unpublished media content over the respective STBs of the users.

In yet another embodiment of the present disclosure, a media processor can have a controller to present a user of the media processor a solicitation initiated by a media content supplier requesting an opinion survey of unpublished media content, receive the unpublished media content responsive to submitting an acceptance of the solicitation, and submit the opinion survey to the media content supplier responsive to receiving a response from the user.

In another embodiment of the present disclosure, a method can involve soliciting a subscriber of a media processor operating in an internet protocol television communication system a response to a presentation of unpublished media content on the media processor, determining a commercialization plan according to the response supplied by the subscriber, and publishing the unpublished media content according to the commercialization plan.

Figure 1:
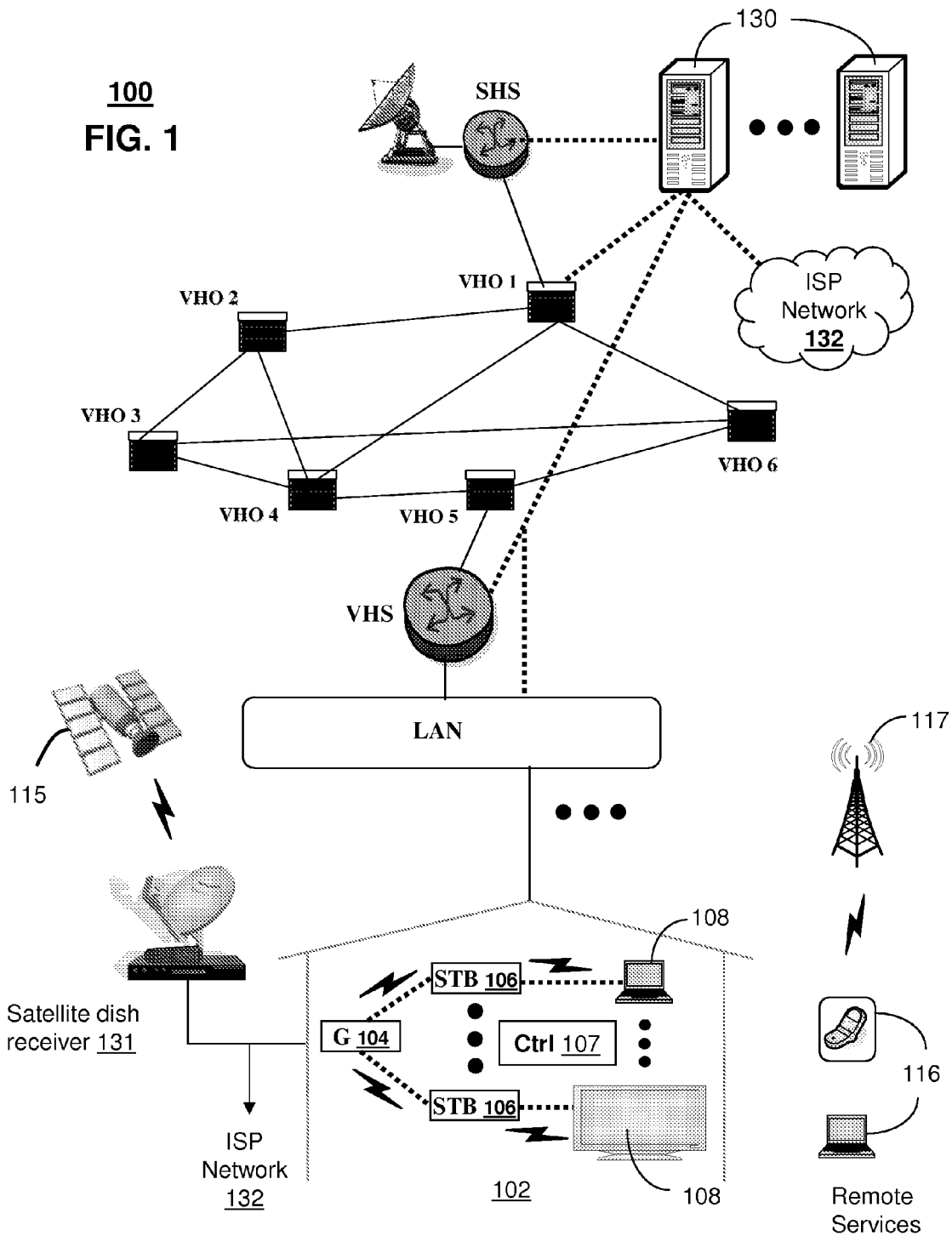
FIGS. 1-4 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as a survey system (herein referred to as survey system 130) for collecting and analyzing survey information supplied by subscribers of the first communication system 100.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
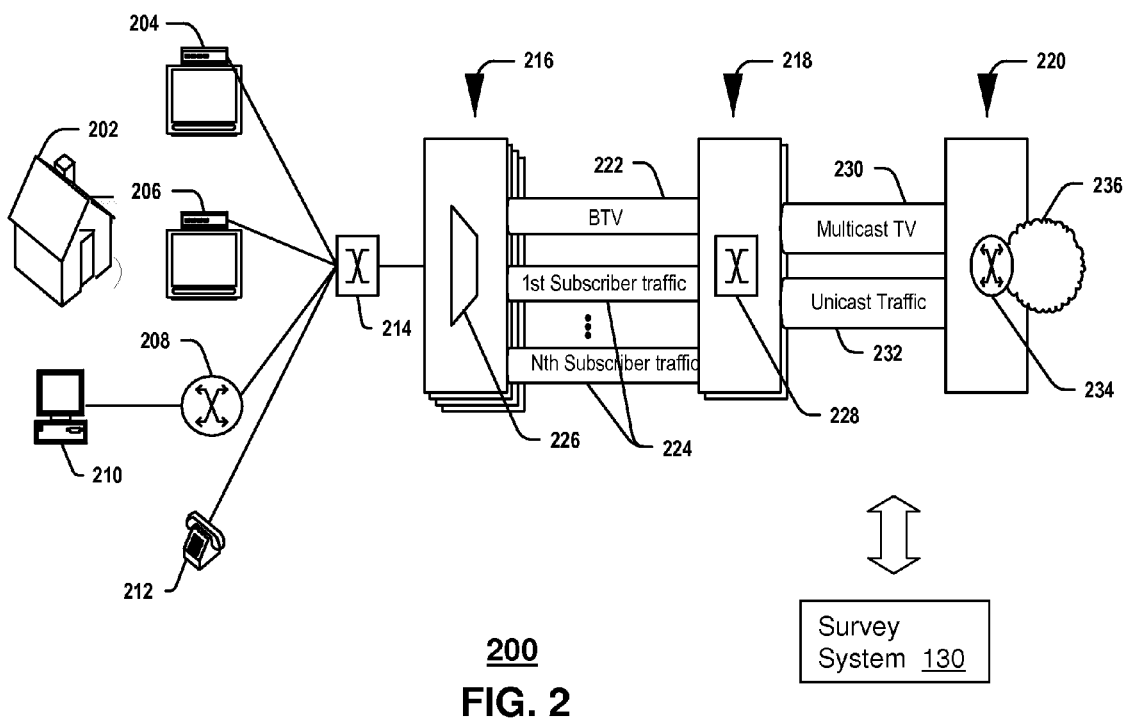

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a (DSLAM). The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The survey system 130 of FIG. 1 can be applied to the second communication system 200 for purposes of collecting and analyzing survey information supplied by subscribers of the second communication system.

Figure 3:
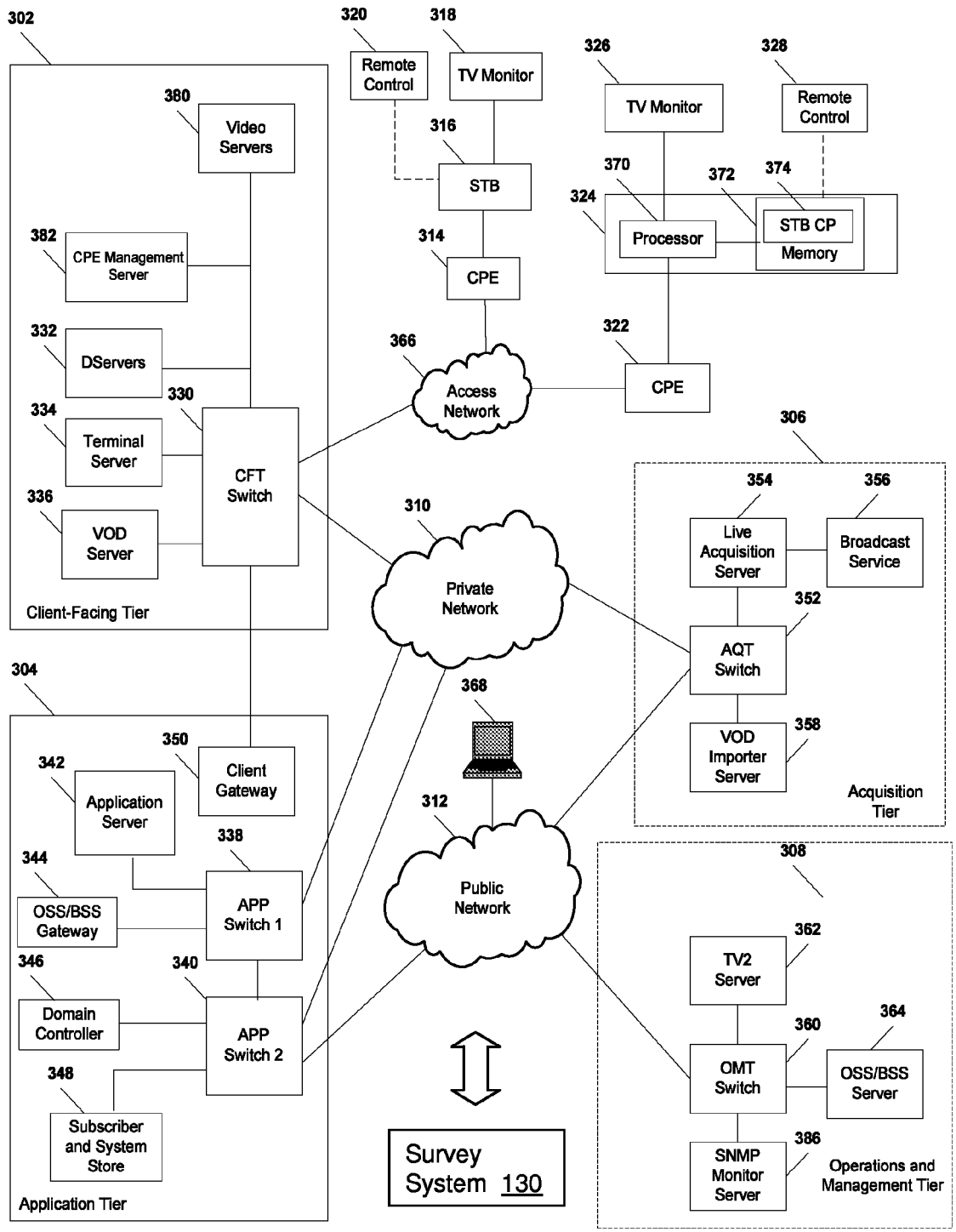

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The survey system 130 of FIGS. 1-2 can also be applied to the third communication system 300 for purposes of collecting and analyzing survey information supplied by subscribers of the third communication system.

It should be apparent to one of ordinary skill in the art from the foregoing media system embodiments that other suitable media systems for distributing broadcast media content as well as peer-to-peer exchange of content can be applied to the present disclosure.

Figure 4:
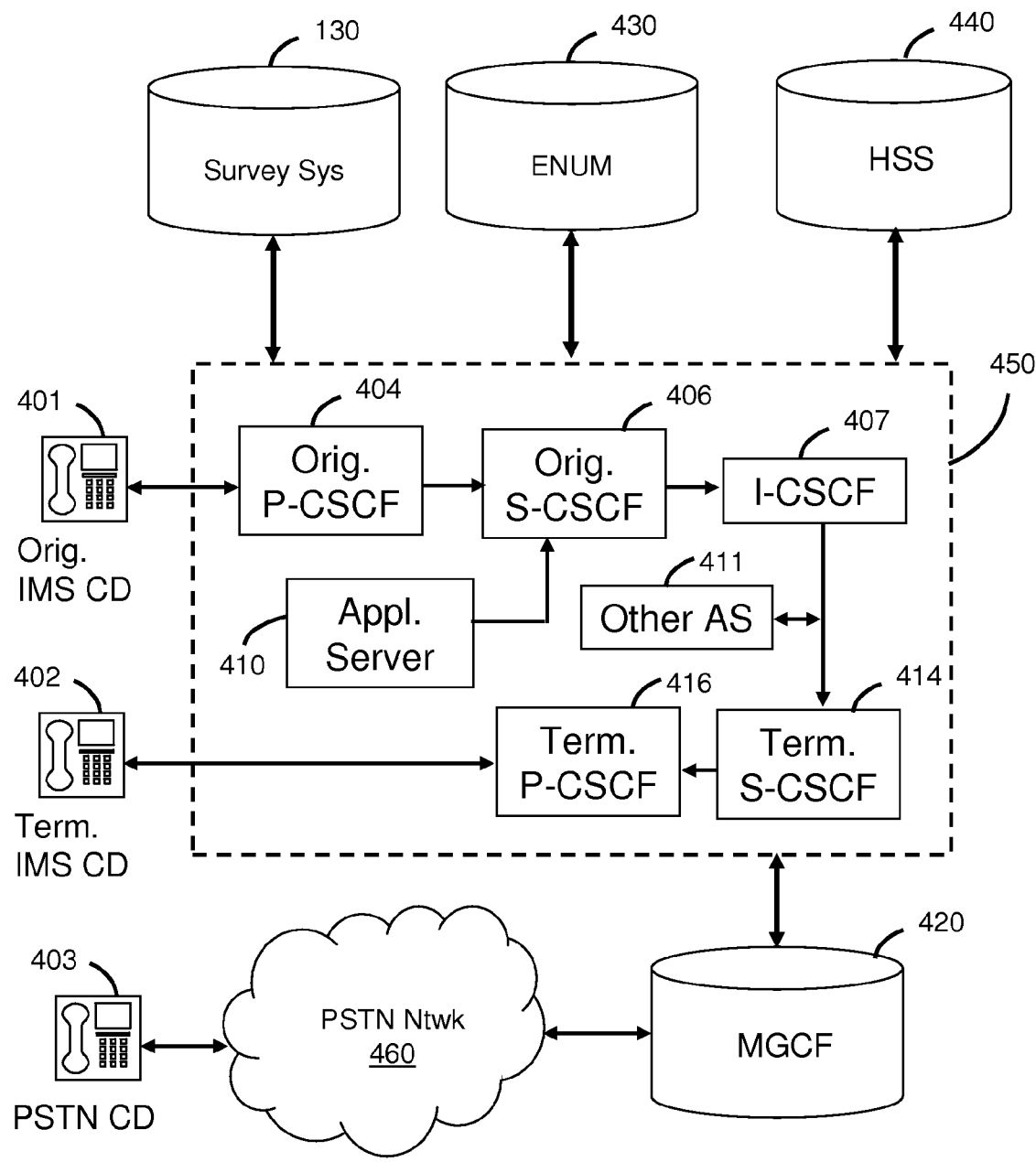

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 115 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (not shown).

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the survey system 130 previously discussed for FIG. 1. In this representative embodiment, the survey system 130 can be accessed over a PSTN or VoIP channel of communication system 400 by common techniques such as described above.

Figure 5:
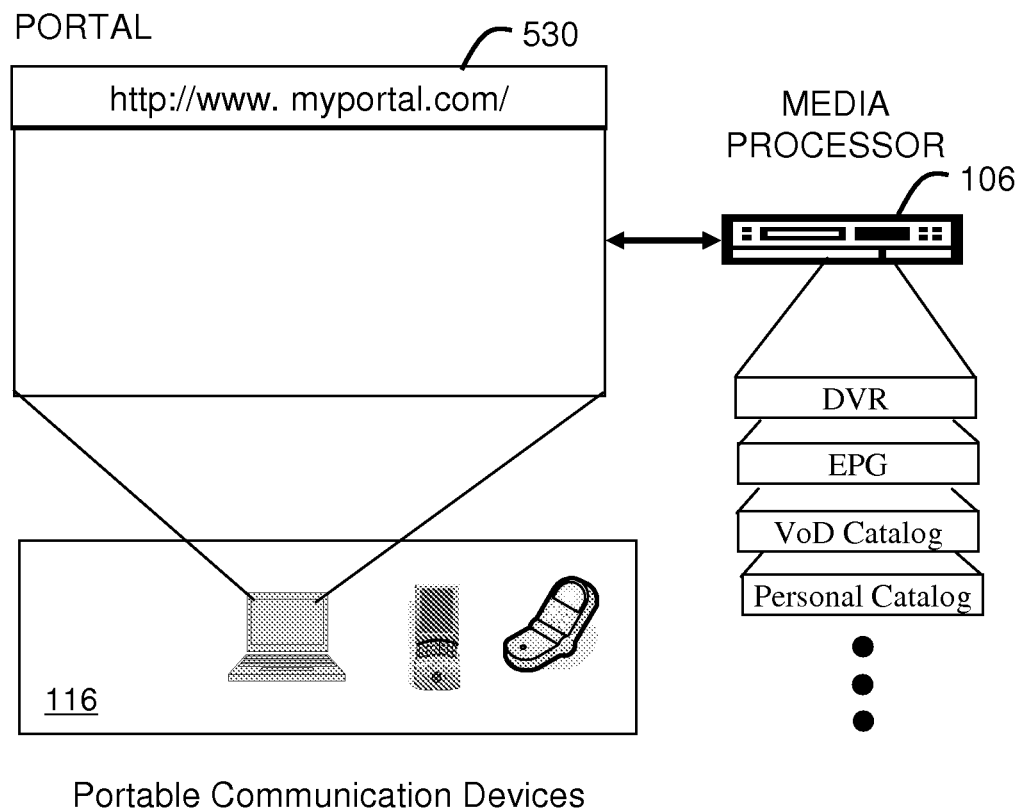
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on.

Figure 6:
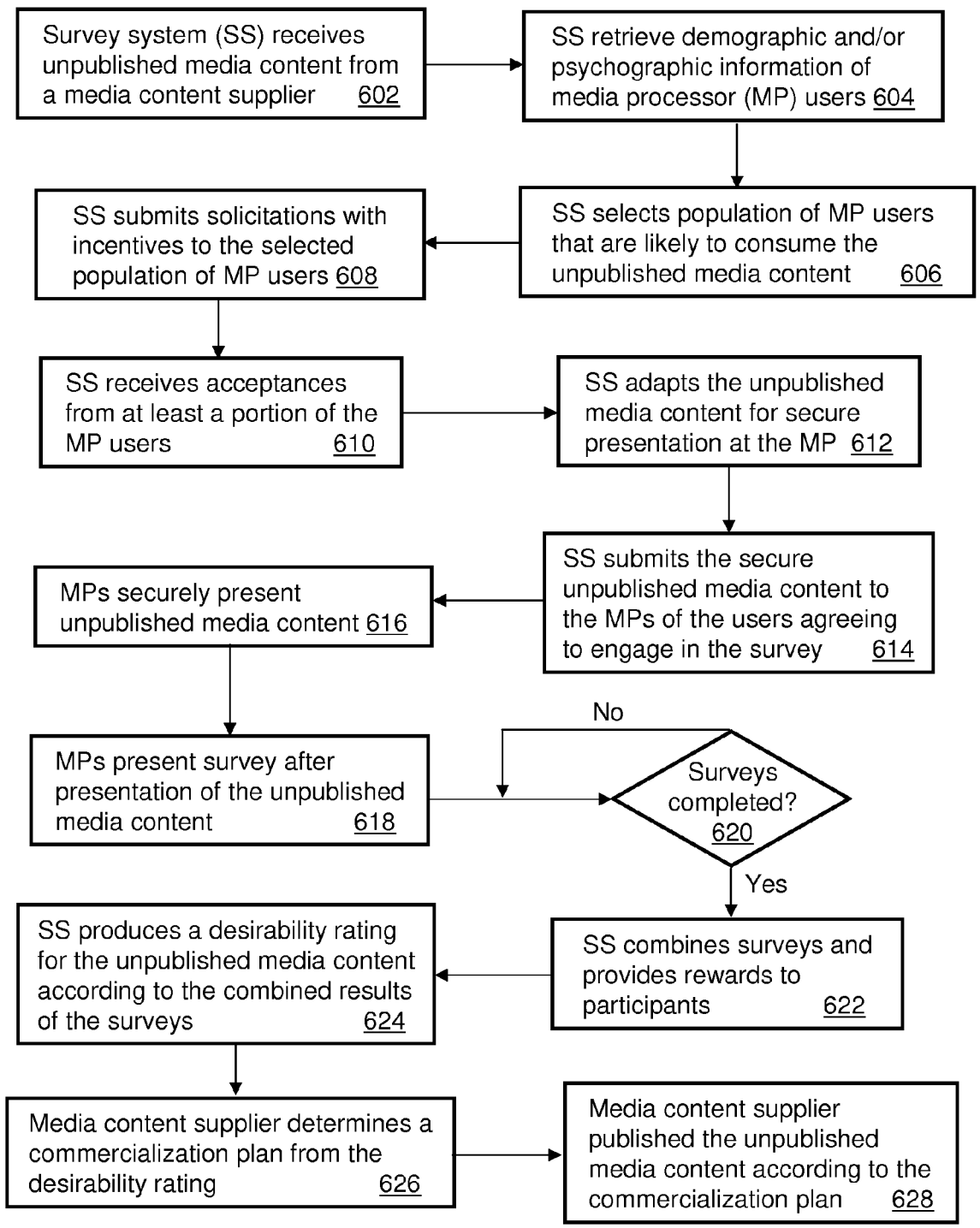
FIG. 6 depicts an exemplary method operating in portions of the communication systems of FIGS. 1-4.

FIG. 6 depicts an exemplary method 600 operating in portions of communication systems 100-400. Method 600 begins with step 602 in which the survey system (SS) 130 receives unpublished media content from a media content supplier. The unpublished media content can be copyrighted media content not yet commercially distributed. Media content can represent audio, moving images or still images, or combinations thereof. An illustrative example of copyrighted audio content can be a music album or single from a musical artist. Moving images can be video games, movies, or other suitable video content. Still images can be copies of artistic renderings, architectural renderings, and so on. From these exemplary embodiments, it should be apparent that media content can have many forms. Consequently media content can be broadly understood to mean any content type that can provide value to its holder—aesthetically, commercially or otherwise.

The media content supplier can be a broadcaster, the author of the content, or any suitable party seeking consideration for the unpublished media content. The media content supplier can utilize the survey system 130 to assess a desirability of the unpublished media content by one or more demographic and psychographic groups. To determine the desirability of the unpublished media content, the survey system 130 can retrieve in step 604 from a database demographic and/or psychographic information of subscribers of media processors 106, 204, 206, 316, 324 (referred to herein collectively for illustration purposes only as STB 106). Demographic information can represent statistics describing factual aspects of a target market (e.g., age, gender, religion, income, special interests, geographic location, etc.), while psychographic information can represent statistics describing psychological traits of a target market such as personality traits, values, attitudes, and lifestyles, just to mention a few.

The survey system 130 can determine demographic and psychographic data of subscribers by mining a database of subscriber information managed by the OSS/BSS 344 of FIG. 3 or some other subsystem of the communication systems of FIG. 1-2 or 4. The subscriber information can be collected by communication systems 100-400 by common means. For example, the communication systems 100-400 can review account records which may provide age, gender, location of subscribers, services subscribed, and so on. The services subscribed can provide for example inferential information as to media biases of the subscriber.

Similarly, communication systems 100-400 can collect consumption data, which can be analyzed, and synthesized into subscriber behavioral profiles based on detectable patterns in the consumption data. A demographic and psychographic information might show that a subscriber is interested in certain TV programs, movies, music, Internet websites, is religiously conservative, and so on. In another illustrative embodiment, the survey system 130 can retrieve demographic and/or psychographic information of subscribers from a third party commercial database that tracks information of subscribers as described above independent of the collection efforts by the databases of communication systems 100-400. The survey system 130 can combine information from both sets of databases to further improve its ability to target subscribers.

Once the survey system 130 collects demographic and/or psychographic information of subscribers, it can utilize common focus group selection techniques in step 606 to select a population of STB 106 users that are likely to consume the unpublished media content to be analyzed. For example, suppose the unpublished media content is a romance movie targeting middle aged adults. This information can be retrieved by the survey system 130 from for example metadata included with the unpublished movie. The survey system 130 can then use this information to seek subscribers of communication systems 100-400 that demographically and/or psychographically match characteristics of the unpublished movie. Similar techniques can be applied to other forms of content such as music, video games, artistic renderings, and so on.

Once the population of subscribers has been selected, the survey system 130 can submit survey solicitations to the selected population. The solicitations can be transmitted to the STBs 106 and/or other communication devices of said subscribers (e.g., cell phones, PDAs, computers, etc.). The solicitation can include with it incentives to draw acceptance of the solicited subscribers to take part in the survey. The incentives can represent rewards in the form of a discount on media services supplied to the subscribers, a discount on fees charged for media consumed by the subscribers, or some other suitable incentive that draws the interest of the subscribers to participate in the survey. It should be noted that in some instances, subscribers may want to participate in surveying unpublished media content for no monetary consideration when the content is popular and in high demand. Some subscribers may view an invitation to survey popular unpublished media content to be a reward in and of itself (e.g., be first to view next Spiderman movie).

The solicitation presented to the selected population of subscribers can represent a simple text message in an email, page, a pop-up graphical user interface (GUI) with selectable buttons, or any other prompting technique which describes to the recipient the intent of the solicitation and responsive actions that can be taken by the recipient. Responses to the solicitation can be an acceptance, a rejection, or no response at all. The proactive responses can be transmitted by way of any of the subsystems of FIGS. 100-400 using a variety of communication techniques such as email, SMS text messaging, media controller 107 selection of a pop-up GUI button (e.g., hit "Accept"), communicating with an interactive voice response (IVR) system o communication system 400, and so on. Responses such as these can be collected in step 610 by the survey system 130 after a reasonable response period (e.g., hours or days) has been provided by the survey system. From these responses, the survey system 130 can assess the portion of the STB 106 population that will participate in the survey.

In step 612, the survey system 130 can adapt the unpublished media content to secure its presentation at the STB 106. The adaptation of the unpublished media content can represent applying a digital rights management (DRM) policy to the unpublished media content to restrict its usage, preventing a recipient STB from storing the unpublished media content, restricting the distribution of the unpublished media content by the recipient STB, and/or directing a recipient STB to degrade a presentation of the unpublished media content at a media device such as a TV, stereo player, etc.

A DRM policy can for example prevent the distribution of the unpublished media content as well as direct the STB 106 to delete the content after its presentation. In another illustrative embodiment, the STB 106 can be directed by the survey system 130 to prevent distribution of the unpublished media content to its subsystems or peripherals coupled thereto (e.g., DVR, VHS recorder, computers, etc.). In yet another illustrative embodiment, the survey system 130 can direct the STB 106 to present a degraded presentation of the unpublished media content (e.g., small screen, quality of picture reduced substantially to degrade copies by camcorders, etc.).

Once the unpublished media content has been secured, the survey system 130 can proceed to step 614 where it submits a copy to the STBs 106 participating in the survey. The STBs 106 in step 616 securely present the unpublished media content as directed by the DRM policy and/or with other security measures. After the unpublished media content has been presented, the STB 106 in step 618 can be directed to present a survey to the subscriber. The survey can be a pop-up GUI with a list of questions with a range of answers, an email message with questions, a telephone call by an IVR, a web page of the portal 530 with check boxes to select a range of choices, and so on. Step 616 can be used broadly speaking to draw any form of responses from subscribers such as opinions, commentaries, narratives, viewpoints, or other suitable forms of feedback information.

While the survey is being conducted, the STB 106 can be directed in step 620 to prevent other media consumption to induce the subscriber to promptly complete the survey. Once the survey(s) have been completed by the solicited subscribers, the survey system 130 can proceed to step 622 where it combines the surveys and provides rewards to its participants as offered in step 608. From the combined or aggregate results of the surveys, the survey system 130 can produce in step 624 a desirability rating for the unpublished media content. The desirability rating can be a simple rating system which indicates the collective desirability of the media content (e.g., a rating of 10 corresponding to highly desirable content, a rating of 1 for highly undesirable content). In another illustrative embodiment, the desirability rating can represent statistics that include for example a standard deviation, variance, and/or a desirability range over a Gaussian distribution of the data collected in step 622.

It should be apparent from these illustrations that any technique can be applied to the present disclosure to establish a desirability rating that can provide the holder of the unpublished media content an indication of its value, probable success of commercialization, suggestions on how to improve portions of the unpublished media content, or any other suitable indicator that can be used by the holder for increasing public demand for the content.

The results produced by the survey system 130 can be utilized by the media content supplier in step 626 to determine a commercialization plan. The commercialization plan can include making improvements to the unpublished media content, developing advertisements that target a specific demographic and/or psychographic group, identifying the extent of investment and risk to be taken in distributing the media, and so on. Once the commercialization plan has been realized, the media content supplier can publish in step 628 the media content to a limited group of consumers or the public at large.

Upon reviewing the aforementioned embodiments, it would be evident to an artisan with ordinary skill in the art that said embodiments can be modified, reduced, or enhanced without departing from the scope and spirit of the claims described below. In one illustrative embodiment, method 600 can be adapted to present surveys at a variety of points in time during the presentation of unpublished media content. This approach can provide the survey system 130 and the media content supplier a more focused survey analysis of the unpublished media. In another illustrative embodiment, method 600 can be adapted so that the survey system 130 synthesizes in step 626 at least a portion of the commercialization plan. The survey system 130 can for example synthesize commercialization plan by applying common business models to the desirability rating as well as the raw survey data collected in step 622.

Other suitable modifications that can be applied to the present disclosure without departing from the scope of the claims below. Accordingly, the reader is directed to the claims section for a fuller understanding of the breadth and scope of the present disclosure.

Figure 7:
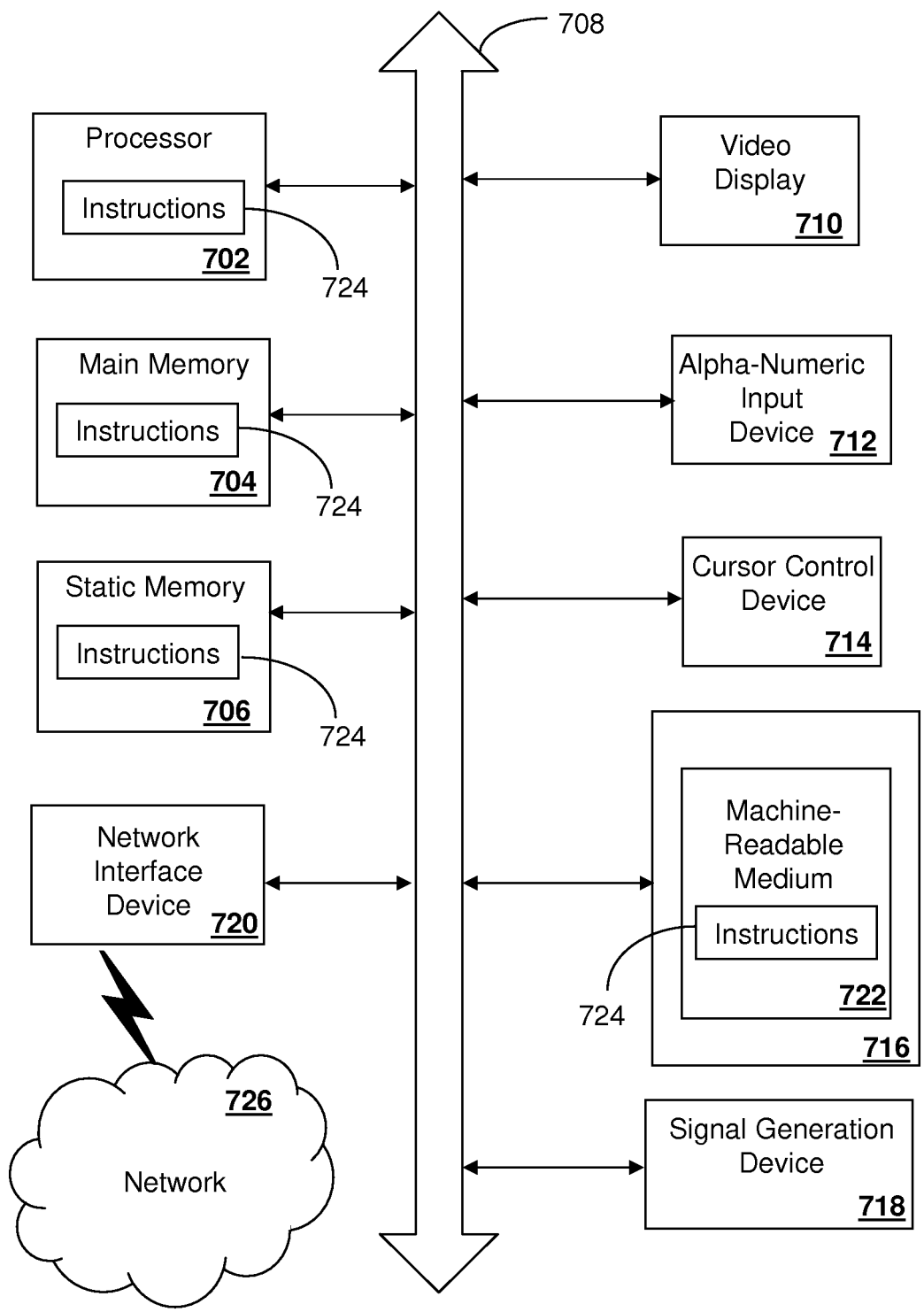
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising executable instructions which when executed by a processor cause the processor to perform operations comprising:

receiving unpublished media content;

identifying characteristics of the unpublished media content from metadata supplied with the unpublished media content;

comparing the characteristics of the unpublished media content to demographic and psychographic information of a population of subscribers who consume media content by way of set top boxes, wherein the demographic and psychographic information of each subscriber is determined from information retrieved from a subscriber account of each subscriber, information retrieved from a third party database, and consumption data collected from a set top box of each subscriber, wherein the demographic information comprises factual aspects of the population of subscribers and the psychographic information comprises psychological traits of the population of subscribers;

selecting, according to the comparing, a plurality of subscribers of the population of subscribers having a likelihood of consuming the unpublished media content;

subsequently soliciting the plurality of subscribers, by way of the set top box of each subscriber of the plurality of subscribers, to participate in an opinion survey regarding the unpublished media content;

receiving acceptances in response to the solicitation from a portion of the plurality of subscribers comprising participating subscribers;

applying a security procedure to the unpublished media content to prevent copying of the unpublished media content;

subsequently transmitting the unpublished media content to the set top boxes of the participating subscribers, wherein the security procedure corresponds to degrading a presentation of the unpublished media content by the set top boxes;

subsequently, after conclusion of transmission of the unpublished media content, transmitting the opinion survey to the set top boxes of the participating subscribers, wherein the unpublished media content and the opinion survey comprise separate transmissions to the set top boxes;

preventing subsequent media consumption via the set-top box of a participating subscriber until the opinion survey is completed by that participating subscriber, thereby conditioning consumption of media content other than the unpublished media content on completion of the opinion survey;

receiving the opinion survey from each set-top box of the participating subscribers;

producing a desirability rating for the unpublished media content from an aggregate of the opinion survey received from each set-top box of the participating subscribers; and synthesizing a commercialization plan based on the desirability rating for the unpublished media content.

2. The non-transitory computer-readable storage medium of claim 1, wherein applying the security procedure comprises applying a digital rights management policy to the unpublished media content that instructs a recipient set top box to perform the degrading of the presentation of the unpublished media content.

3. The non-transitory computer-readable storage medium of claim 1, wherein the unpublished media content comprises audio content, video content, or still image content, and wherein the unpublished media content comprises copyrighted media content not yet commercially distributed.

4. The non-transitory computer-readable storage medium of claim 1, wherein the psychographic information comprises psychological traits of the plurality of subscribers including personality traits, values, attitudes, or lifestyles.

5. The non-transitory computer-readable storage medium of claim 1, wherein the operations further comprise offering the plurality of subscribers a reward for reviewing the unpublished media content.

6. The non-transitory computer-readable storage medium of claim 5, wherein the reward comprises a first discount applied to fees associated with media services supplied to the subscribers, or a second discount applied to fees associated with other media consumable by the subscribers.

7. The non-transitory computer-readable storage medium of claim 1, wherein the non-transitory computer-readable storage medium operates as a survey system in a broadcast television communication system, a cable television communication system, a satellite television communication system, a public switched telephone network, a voice over internet protocol communication system, or an internet protocol multimedia subsystem combining the public switched telephone network and voice over internet protocol communication systems.

8. The non-transitory computer-readable storage medium of claim 1, wherein the operations further comprise receiving the opinion survey from a communication device of a participating subscriber.

9. The non-transitory computer-readable storage medium of claim 8, wherein the opinion survey comprises text, image or audio feedback supplied by the participating subscriber.

10. The non-transitory computer-readable storage medium of claim 1, wherein the operations further comprise combining the opinion surveys received from the participating subscribers.

11. A non-transitory computer-readable storage medium, comprising executable instructions which when executed by a processor cause the processor to perform operations comprising:

selecting users from a population of users of set-top boxes to survey unpublished media content according to a comparison of characteristics of the users and characteristics of the unpublished media content, where the characteristics of the selected users are determined from demographic and psychographic information of the selected users, wherein the demographic and psychographic information of the selected users is determined from information retrieved from a subscriber account of each of the selected users, information retrieved from a third party database, and consumption data collected from a set top box of each of the selected users, wherein the demographic information comprises factual aspects of the selected users and the psychographic information comprises psychological traits of the selected users;

subsequently transmitting to the set top boxes of the selected users a solicitation to provide a response to a survey regarding a presentation of the unpublished media content over the set top boxes of the selected users;

applying a security procedure to the unpublished media content, wherein the security procedure corresponds to degrading the presentation of the unpublished media content by the set top boxes;

subsequently, after conclusion of the presentation of the unpublished media content, transmitting the survey to the set top boxes of users accepting the solicitation comprising participating users, wherein the unpublished media content and the survey comprise separate transmissions to the set top boxes;

preventing subsequent media consumption via the set-top box of a participating user until the survey is completed by that participating user, thereby conditioning consumption of media content other than the unpublished media content on completion of the survey;

producing a desirability rating for the unpublished media content from an aggregate of survey results received from the set top boxes of the participating users;

synthesizing a commercialization plan based on the desirability rating for the unpublished media content.

12. The non-transitory computer-readable storage medium of claim 11, wherein the unpublished media content comprises audio content, video content or still image content, and wherein the unpublished media content comprises copyrighted media content not yet commercially distributed.

13. The non-transitory computer-readable storage medium of claim 11, wherein applying the security procedure comprises applying a digital rights management policy to the unpublished media content, and wherein the operations further comprise offering the selected users of set top boxes a reward for reviewing the unpublished media content.

14. The non-transitory computer-readable storage medium of claim 11, wherein the operation of producing the desirability further comprises:

receiving responses from a portion of the selected users from the set top box or a communication device of each of the selected users;

combining the responses; and producing the desirability rating of the unpublished media content according to the combined responses, wherein the responses comprise text, image or audio feedback supplied by a participating user.

15. A media processor, comprising a memory storing executable instructions and a controller coupled to the memory, wherein the controller when executing the instructions performs operations comprising:

presenting at a media processor of a user a solicitation initiated by a media content supplier requesting an opinion survey of unpublished media content, wherein the user is selected from a population of users of media processors according to a similarity between characteristics of the user and characteristics of the unpublished media content, wherein the characteristics of the user is determined from demographic and psychographic information of the user, wherein the demographic and psychographic information of the user is determined from information retrieved from a subscriber account of the user, information retrieved from a third party database, and consumption data collected from the media processor of the user, wherein the demographic information comprises factual aspects of the user and the psychographic information comprises psychological traits of the user;

applying a security procedure to the unpublished media content, wherein the security procedure corresponds to degrading a presentation of the unpublished media content by the media processor;

subsequently, after conclusion of the presentation of the unpublished media content, presenting the opinion survey at the media processor of the user, wherein the presentation of the unpublished media content and presentation of the opinion survey comprise separate presentations at the media processor;

preventing subsequent media consumption via the media processor of the user until the opinion survey is completed by the user, thereby conditioning consumption of media content other than the unpublished media content on completion of the opinion survey; and submitting the opinion survey to the media content supplier responsive to receiving a survey response from the media processor of the user;

wherein the opinion survey comprises a desirability rating for the unpublished media content.

16. The media processor of claim 15, wherein the media processor further comprises a set-top box, a digital video recorder, a computer, a media player, a portable wireless phone or a fixed line phone, wherein the unpublished media content comprises audio content, video content or still image content, and wherein the unpublished media content comprises copyrighted media content not yet commercially distributed.

17. The media processor of claim 15, wherein the media processor operates in a broadcast television communication system, a cable television communication system, a satellite television communication system, a public switched telephone network, a voice over internet protocol communication system or an internet protocol multimedia subsystem combining the public switched telephone network and voice over internet protocol communication systems.

18. A method, comprising:

selecting, by a system including a processor, a subscriber to survey unpublished media content according to similarities in biases of the subscriber to characteristics of the unpublished media content, wherein biases of the subscriber are determined from information retrieved from a subscriber account of the subscriber, from consumption data collected from a media processor of the subscriber, and from demographic and psychographic information of the subscriber, wherein the demographic information comprises factual aspects of the subscriber and the psychographic information comprises psychological traits of the subscriber;

subsequently presenting, by the system, a solicitation by way of the media processor of the subscriber for a response from the subscriber to a presentation of the unpublished media content on the media processor;

applying a security procedure to the unpublished media content, wherein the security procedure corresponds to degrading the presentation of the unpublished media content by the media processor;

subsequently transmitting, by the system, after conclusion of the presentation of the unpublished media content, an opinion survey to the media processor of the subscriber in accordance with the subscriber accepting the solicitation, wherein the presentation of the unpublished media content and the opinion survey comprise separate transmissions to the media processor;

preventing, by the system, subsequent media consumption via the media processor of the subscriber until the survey is completed by the subscriber, thereby conditioning consumption of media content other than the unpublished media content on completion of the opinion survey;

producing, by the system, a desirability rating for the unpublished media content from an aggregate of survey results received from a device of the subscriber and from devices of other subscribers;

synthesizing, by the system, a commercialization plan according to the desirability rating for the unpublished media content; and publishing, by the system, the unpublished media content according to the commercialization plan.

19. The method of claim 18, wherein the media processor corresponds to a set-top box, a digital video recorder, a computer, a media player, a wireless communication device or a fixed line communication device, wherein the unpublished media content comprises audio content, video content or still image content, and wherein the unpublished media content comprises copyrighted media content not yet commercially distributed, and wherein the method further comprises:

updating, by the system, the unpublished media content before publishing according to the response from the subscriber to the presentation of the unpublished media content; and publishing, by the system, the updated unpublished media content according to the commercialization plan.

20. The method of claim 18, wherein applying the security procedure comprises applying a digital rights management policy to the unpublished media content.

* * * * *